US012045012B2

(12) United States Patent
Zaugg

(10) Patent No.: US 12,045,012 B2
(45) Date of Patent: Jul. 23, 2024

(54) MECHANICAL MOVEMENT WATCH WITH A FORCE CONTROL MECHANISM

(71) Applicant: Montres Breguet S.A., L'Abbaye (CH)

(72) Inventor: Alain Zaugg, Le Sentier (CH)

(73) Assignee: Montres Breguet S.A., L'Abbaye (CH)

( * ) Notice: Subject to any disclaimer, the term of this patent is extended or adjusted under 35 U.S.C. 154(b) by 366 days.

(21) Appl. No.: 17/476,958

(22) Filed: Sep. 16, 2021

(65) Prior Publication Data

US 2022/0163922 A1 May 26, 2022

(30) Foreign Application Priority Data

Nov. 20, 2020 (EP) .................................... 20208925

(51) Int. Cl.
*G04B 15/08* (2006.01)
*G04B 13/02* (2006.01)
(Continued)

(52) U.S. Cl.
CPC ............. *G04B 15/08* (2013.01); *G04B 13/02* (2013.01); *G04B 17/285* (2013.01); *G04B 19/02* (2013.01)

(58) Field of Classification Search
CPC ...... G04B 15/08; G04B 13/02; G04B 17/285; G04B 19/02
(Continued)

(56) References Cited

U.S. PATENT DOCUMENTS

2020/0033804 A1* 1/2020 Di Domenico ........ G04B 31/06
2020/0117143 A1* 4/2020 Hide .................... G04B 19/253
(Continued)

FOREIGN PATENT DOCUMENTS

CH 330892 A 6/1958
CH 702 179 A2 5/2011
(Continued)

OTHER PUBLICATIONS

Combined Chinese Office Action and Search Report issued Aug. 24, 2023, in corresponding Chinese Patent Application No. 202111174508.X (with English Translation of Category of Cited Documents), 8 pages.

(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A watch has a mechanical movement with a force control mechanism arranged in a going train of the mechanical movement between an energy source and an escape wheel set connected to an oscillating oscillator to drive the escape wheel set always in the same direction of rotation. The escape wheel set meshes with a seconds wheel. A rotating locking element is arranged to cooperate with a stop member connected to this seconds wheel in order to lock this going train in a stop mode or to release this going train in a jump mode depending on the angular position of this seconds wheel. A flexure bearing with elastic strips is attached on the one hand to the seconds wheel and on the other hand to the movement support. The pre-wound flexure bearing is arranged to drive in rotation the seconds wheel and the escapement mechanism connected to the oscillator at each half-oscillation of the oscillator in the stop mode.

18 Claims, 3 Drawing Sheets

(51) Int. Cl.
*G04B 17/28* (2006.01)
*G04B 19/02* (2006.01)

(58) Field of Classification Search
USPC .......................................................... 368/132
See application file for complete search history.

(56) References Cited

U.S. PATENT DOCUMENTS

| | | | | |
|---|---|---|---|---|
| 2020/0150595 | A1* | 5/2020 | Winkler ............... | G04B 17/045 |
| 2021/0096513 | A1 | 4/2021 | Hide et al. | |

FOREIGN PATENT DOCUMENTS

| | | | |
|---|---|---|---|
| CH | 703 331 | A2 | 12/2011 |
| CN | 106990696 | A | 7/2017 |
| CN | 110622073 | A | 12/2019 |
| CN | 110892339 | A | 3/2020 |
| EP | 3 598 241 | A1 | 1/2020 |
| WO | WO 2011/113757 | A1 | 9/2011 |
| WO | WO 2018/193365 | A1 | 10/2018 |

OTHER PUBLICATIONS

European Search Report issued Apr. 30, 2021 in European Application 20208925.6, filed on Nov. 20, 2020 (with English Translation of Categories of cited documents), 3 pages.

* cited by examiner

MECHANICAL MOVEMENT WATCH WITH A FORCE CONTROL MECHANISM

CROSS-REFERENCE TO RELATED APPLICATION

This application claims priority to European Patent Application No. 20208925.6 filed on Nov. 20, 2020, the entire disclosure of which is hereby incorporated herein by reference.

FIELD OF THE INVENTION

The invention concerns a mechanical movement watch with a force control mechanism, such as for the force due to gravity when the watch is worn, and of the jumping seconds type. Preferably, the force control mechanism can be a tourbillon mechanism mounted around the escapement. The tourbillon carriage contains the escapement mechanism and preferably the carriage makes one full rotation every minute, in particular with 60 one-second jumps.

BACKGROUND OF THE INVENTION

As a reminder, in watchmaking, a tourbillon, also called a ‘rotating cage’ is a timepiece complication, added to the escapement mechanism, intended to improve the precision of mechanical watches by counterbalancing disturbances in the isochronism of the resonator due to earth’s gravity. The fundamental criterion, which distinguishes a tourbillon, particularly with respect to a karrusel, is the presence of a fixed gear train on which the tourbillon carriage meshes. Generally, the tourbillon carriage is mounted to rotate between two points of attachment.

Account is also taken of gravity to compensate for any disturbances in the isochronism of the resonator. The escapement is coupled to the resonator. It interacts with the latter once or twice per oscillation period. The angle through which the resonator moves during the interaction is called the angle of lift. The remaining travel of the resonator is called the supplementary angle or arc.

During the supplementary arc, the resonator can be in contact with the escapement (frictional rest escapement) or have no contact (free escapement). During the angle of lift, the escapement executes two main phases, which are the unlocking (or counting) phase and the impulse (or maintenance of oscillations).

In a timepiece complication, the purpose of the jumping seconds mechanism is to display the seconds in steps of one complete second, which, on a 60-second dial, corresponds to an angle of 6° per second. The jumping seconds mechanism is often associated with constant force mechanisms, which take advantage of the distinctive design feature of jumping seconds. Independent seconds or fixed seconds mechanisms are also similar to these designs with the distinctive feature of being able to stop the seconds at will, like a chronograph.

There are several jumping seconds mechanisms in horological literature and patents, and they are applied. In certain examples, in a Jacquet Droz watch, there is the Blancpain 1195 movement. For the Marie Antoinette watch by Breguet, there is the independent seconds mechanism.

WO Patent Application No. 2011/157797 A1 discloses a mechanism for advancing, in periodic jumps, a pivoting carriage carrying an escape wheel and pinion and a lever cooperating with the wheel and a balance/balance spring. In addition, it comprises a retaining means for authorising or prohibiting the pivoting of said carriage depending on whether said retaining means is moving or not. There is also a stopping mechanism for authorising or prohibiting the pivoting of the retaining means, depending on the angular position of said stopping means. A constant force device periodically causes the retaining means to cooperate. This device comprises a flirt arranged to make complete revolutions.

The principle of the mechanisms described is to retain the going train between the escapement and the seconds wheel by a mechanism, while an additional spring maintains the escapement with a constant force in a stopping phase. At the end of the second, which is counted by the escapement, the released train makes it possible to advance one second. Thus, the display advances and the mechanism is reset in the jump phase.

In such a mechanism operating at frequencies close to the second, the torques available in watchmaking are very low. This is why these mechanisms are difficult to make and generally unreliable.

In the mechanism of the Blancpain 1195 movement, there is a stop system which distributes a portion of torque in the locking of the stop phase to compensate for friction. This provides a jumping seconds with an angular displacement of around 20% in the stop phase for an 80% jump.

It is also possible to envisage lowering the frequency and making independent minutes instead of seconds, which facilitates construction.

Some of these mechanisms can become desynchronized once completely let down and move into a locking position. This requires a stop system linked to a power reserve mechanism, which will stop the mechanism before it is complete let down.

In a mechanism disclosed in EP Patent No. 1 528 443 B1, a constant force device is proposed for a watch with independent seconds. This device makes it possible to move a wheel set arbor on a lever driven by an energy storage spring which tends to pivot the lever. The device comprises a pinion of a first seconds wheel of the movement, which meshes with an intermediate wheel mounted to pivot on this lever, and which meshes with the pinion of a second seconds wheel defining the wheel set. The lever carrying a finger must adapt to cooperate with a ratchet toothing of a stop wheel, which meshes with the first seconds wheel. When the finger is in mesh with a radial flank of the ratchet, the gear train, notably comprising the first seconds wheel and the intermediate wheel, is locked with no transmission of force from the first seconds wheel and the intermediate wheel. The second seconds wheel is controlled by the escapement and only rotates when the latter is moved by the balance. The spring is wound by the movement of the lever in the opposite direction, whereby the spring exerts on the lever a lower torque than that exerted by the mainspring on the lever when the stop wheel is released. This device thus allows the winding/letting down cycle to be adapted according to the number of stop wheel teeth. This device ensures a jumping seconds function, but the main drawback is that it is not easy to make with a large number of components necessary to perform this operation. In addition, there is a movement of a wheel set as the seconds jump, which is not desired.

CN Utility Model 209014916 U discloses a tourbillon mechanism having a toothed wheel. The toothed wheel is composed of a central portion for passage of an arbor, connected by spring-like metal coils to an inner wall of a crown with outer peripheral teeth.

EP Patent No. 3 356 690 B1 discloses a timepiece component having a well-known type of flexure pivot with separate crossed strips and having means for adjusting the position of the crossing point of the strips.

SUMMARY OF THE INVENTION

The present invention seeks to achieve a jumping seconds display with constant force in a simpler manner, without moving a wheel set and with no risk of desynchronization at the end of the winding cycle and thus limiting friction, for use, in particular, in a tourbillon movement.

It is thus an object of the invention to overcome the drawbacks of the state of the art by providing a mechanical movement watch with a force compensation or control mechanism of the jumping seconds type that overcomes the drawbacks of the aforementioned prior art devices.

To this end, the invention concerns a mechanical movement watch with a force compensation or control mechanism of the jumping seconds type, which includes the features defined in the independent claim 1.

Particular embodiments of the mechanical movement watch with a force compensation or control mechanism of the jumping seconds type are also described in the dependent claims 2 to 18.

One advantage of the mechanical movement watch with a force compensation or control mechanism according to the invention lies in the fact that it comprises a seconds wheel for accumulating the energy required to maintain several oscillations of the escapement mechanism with the oscillator, particularly in a stop mode before switching to a jump mode. Depending on the frequency of the resonator provided with a conventional escapement, the seconds wheel maintains a few oscillations of the resonator or oscillator without part of the gear train from the barrel being driven. Preferably, the seconds wheel releases a locking element, such as a flirt, after a certain number of oscillations in order to move the tourbillon carriage 6° in the clockwise direction (SAM) and the going train from the barrel defining a seconds wheel of the jumping seconds type. In the case of the tourbillon according to an example embodiment, on at least the fifth pulse of the 2.5 Hz oscillator, the flirt is released and thereby the intermediate wheel connected to the flirt, the medium wheel, the medium large wheel and the barrel, to drive the tourbillon carriage through a 6° step in a direction opposite to the accumulation of the seconds wheel. Primarily, the tourbillon carriage can be moved angularly after a certain number of oscillations defining one second. By means of this arrangement which avoids moving a wheel set, the risk of desynchronization at the end of winding is not affected.

Advantageously, the seconds wheel is intended to move a certain number of small steps in the stop phase, following the oscillations of the balance spring of the oscillator connected to the escapement mechanism, which is of the Swiss lever type. In this stop phase or stop mode, the seconds wheel rotates in the anticlockwise direction while being driven in rotation by a monolithic articulated structure or flexure bearing with elastic strips, which is pre-wound. A moving portion of this flexure bearing is secured to one face of the seconds wheel, while a fixed portion of this flexure bearing is secured to a support of the timepiece movement, such as a plate. The movable portion of this flexure bearing is preferably secured directly beneath the seconds wheel. The flexure bearing is mounted through an axial opening, coaxially to a seconds-wheel pinion, which is the seconds-wheel and tourbillon pinion.

Advantageously, the flexure bearing with elastic strips (strip springs) comprises several elastic strips in series connecting more solid parts, including the movable and fixed portions of the flexure bearing, and possibly other intermediate portions. The flexure bearing with elastic strips in series can thus be made with a more robust structure capable of ensuring the rotation of the seconds wheel with a return torque advantageously used to replace the spring of the force control mechanism and with better axial retention. Further, such a flexure bearing with elastic strips ensures an absence of friction, wear and energy dissipation, in addition to an absence of play, and ensures precise guiding.

BRIEF DESCRIPTION OF THE DRAWINGS

The objects, advantages and features of the mechanical movement watch with a force compensation or control mechanism will appear more clearly in the following description, particularly with reference to the drawings, in which.

DETAILED DESCRIPTION OF THE INVENTION

In the following description, various members or elements of the mechanical watch movement with a force control mechanism and of the jumping seconds type, which are well known in this technical field, will be only briefly described.

It should first be noted that the mechanical movement watch with a force control mechanism and of the jumping seconds type can have a tourbillon whose carriage contains an oscillator and an escapement mechanism as explained hereinafter, or, like a conventional mechanical movement, have no tourbillon, which will be explained hereinafter with reference to FIG. 4.

Figure 1:
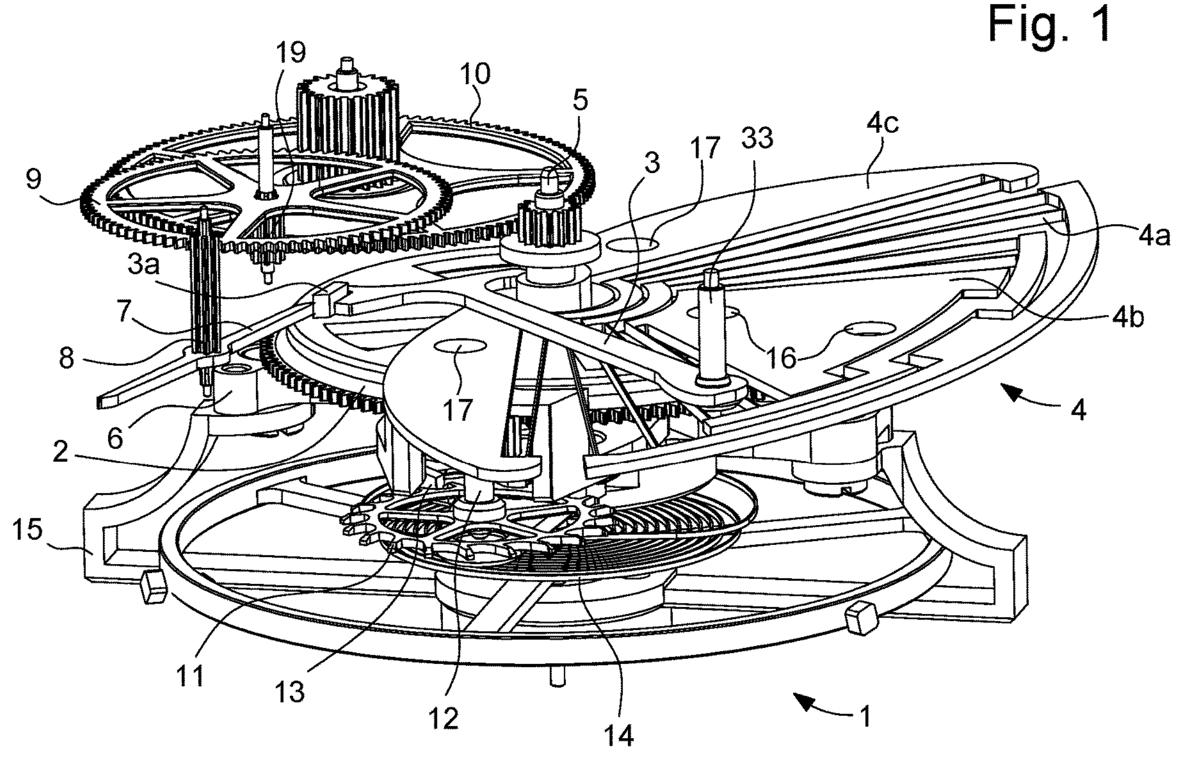
FIG. 1 represents a three-dimensional view from below of the main elements of the watch movement with a force control mechanism and of the jumping seconds type according to the invention.
Figure 2:
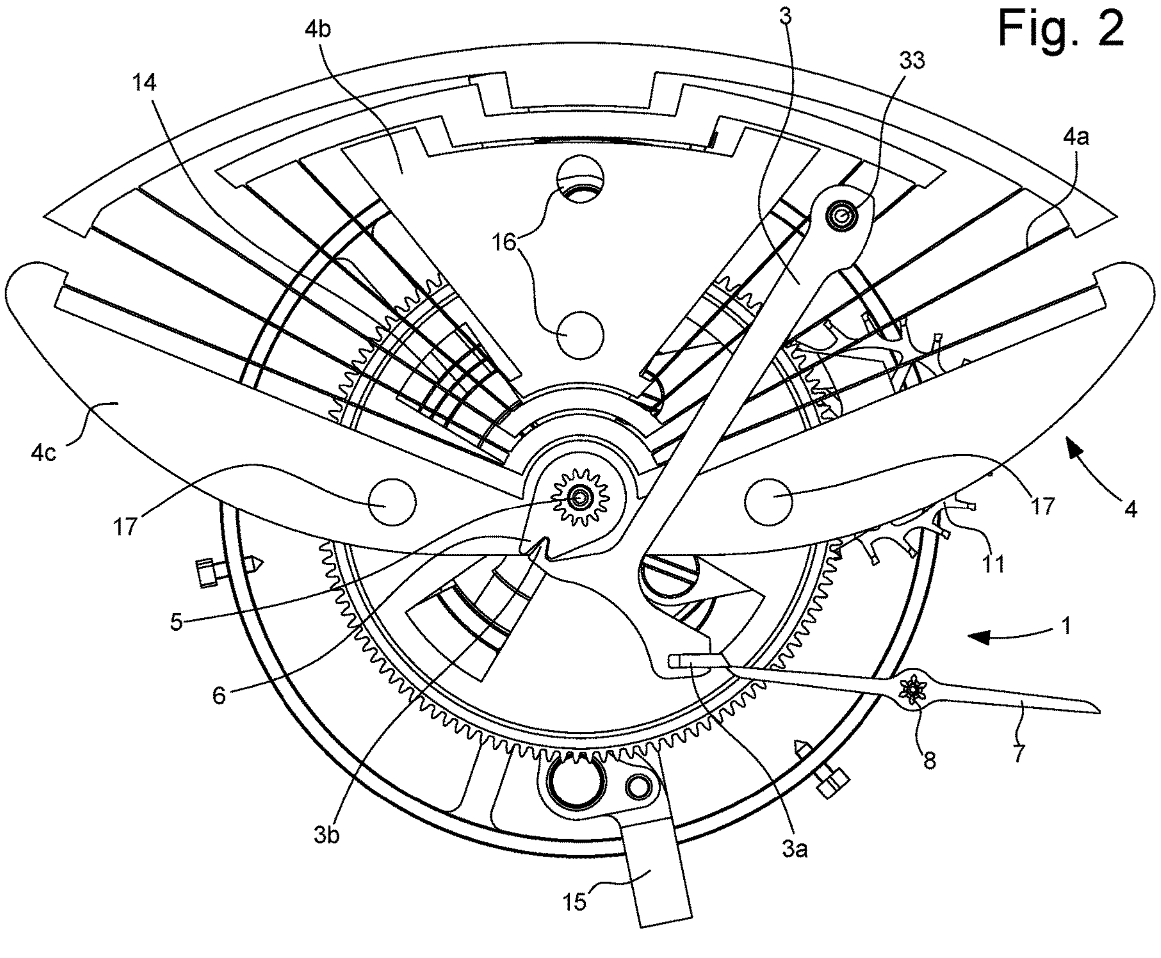
FIG. 2 represents a bottom view of the mechanical watch movement with a force control mechanism of the jumping seconds type without the medium wheel and the intermediate wheel according to the invention.

FIGS. 1 and 2 represent a part of a mechanical watch movement 1 which is represented without the energy source, such as the barrel which is the mainspring and which is connected, in this case, to a fusee connected by a chain to the barrel drum to drive the latter. A medium large wheel, which is driven in rotation by a peripheral toothing of the fusee according to a conventional embodiment, is also not shown. This energy is applied as a torque to the pinion of medium wheel 10.

FIGS. 1 and 2 thus represent part of a mechanical watch movement comprising a going train 5, 8, 9, 10 in which is arranged a force control mechanism of mechanical watch movement 1. This force control mechanism can be similar to a constant force device. The going train is arranged between an energy source (not represented), which is preferably a barrel and mainspring, and an escapement mechanism, for example a Swiss lever escapement 13 having an escape wheel set 11 in the form of a wheel, alternately retained and released by an oscillator 14, which is preferably a balance/balance spring which receives energy to maintain its oscillation from said escape wheel set 11. Escape wheel set 11 is arranged to be able to rotate in the same direction of rotation at each half-oscillation of oscillator 14.

Escape wheel set 11 meshes with a seconds wheel 2 which is also referred to hereinafter as a fixed seconds wheel SFA. This seconds wheel 2 is called a fixed seconds wheel SFA even if it is not stationary in operation. This fixed seconds wheel SFA 2 can rotate in the anticlockwise direction (SIAM) to maintain the operation of the escapement mechanism linked to the oscillator in a stop mode, and rotate in the clockwise direction (SAM) in a jump mode to make a jump corresponding to 1 second. Both in the embodiment with a tourbillon and in the embodiment without a tourbillon, there is always a stop phase and a jump phase to achieve a jump on the display corresponding to one second.

To this end, the fixed seconds wheel SFA 2 preferably comprises a peripheral toothing meshing with a toothed escape pinion 12 coaxial to said escape wheel set 11. As explained below, in a stop phase of the going train, fixed seconds wheel SFA 2 rotates in the anticlockwise direction (SIAM) by means of the return force of flexure bearing 4 and drives escape wheel set 11 at each half-oscillation of oscillator 14 via toothed escape pinion 12, in order to maintain the operation of the oscillator and the escapement mechanism during this stop phase.

During this stop phase, fixed seconds wheel SFA 2 pivots anticlockwise SIAM on its flexure bearing 4 about tourbillon carriage 15 without touching the latter, which is stopped. This SIAM pivoting of SFA 2 continues until going train 5, 8, 9, 10 is released whereby a one-second jump is made by tourbillon carriage 15 and its seconds-wheel pinion 5, driving therewith fixed seconds wheel SFA 2, which is connected to escape wheel set 11, in the jump phase in clockwise direction SAM.

To define the stop phase and the jump phase, the force control mechanism comprises, on the one hand, a preferably rotating locking element 7 arranged to cooperate with a stop member 3 connected to fixed seconds wheel SFA 2 in the stop mode. As illustrated in FIGS. 1 and 2, this stop member 3 can be a rack 3, rotatably mounted at a first end of rack 3 about an arbor 33 arranged, for example, between a movement assembly plate and a medium wheel bridge (which are not shown). A second free end of rack 3 comprises, in a locking part, a finger-shaped edge portion **3*b* freely arranged inside a guide housing between two teeth of a cam 6. Cam 6 is fixedly mounted to said fixed seconds wheel SFA 2 close to the centre thereof in order to drive rack 3 in rotation in each direction. The second free end of rack 3 further comprises a stop piece 3*a*, such as a pallet stone 3*a*, arranged on an opposite side to edge portion 3*b* and arranged to block rotating locking element 7 in a stop mode. Pallet stone 3*a* can be made of a hard material reducing friction with locking element 7 which is in contact with pallet stone 3*a* in a stop phase. This stop piece, which is pallet stone 3*a***, can be made of a friction-reducing material like ruby.

To drive in rotation fixed seconds wheel SFA 2, particularly in a stop mode, a flexure bearing 4 with elastic strips **4*a* or strip springs, which is pre-wound, is directly connected to fixed seconds wheel SFA 2. Flexure bearing 4 acts like a spring on fixed seconds wheel SFA 2. To this end, flexure bearing 4 comprises a movable portion 4*c* with at least one opening 17, but preferably two openings 17, for attachment to one face of fixed seconds wheel SFA 2. Preferably, flexure bearing 4 is secured to a lower face of fixed seconds wheel SFA 2**.

It should be noted that elastic strips **4*a* are defined, these strips can be of rectangular, hexagonal or round cross-section. These elastic strips have a geometry: a length and cross-section which must be clearly determined to ensure the spring function in order to drive fixed seconds wheel SFA 2 in rotation with the necessary torque. Reference can be made to the work of W. H. Wittrick referred to below, to make flexure bearings 4 with elastic strips 4*a***.

Figure 5:
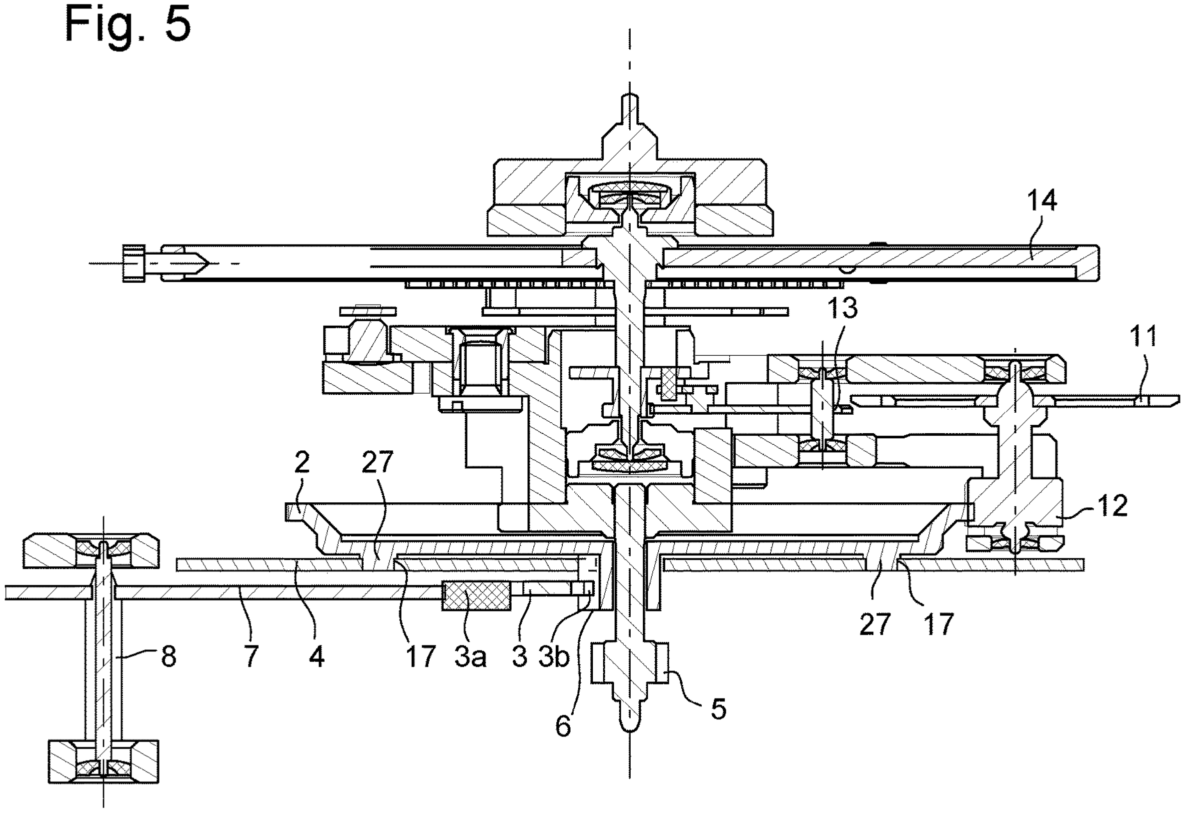
FIG. 5 represents a bottom to top cross-section of the mechanism at the centre of the tourbillon, as represented partially above in FIG. 1.

As represented in FIG. 5, at least one means of attachment 27 in or through opening(s) 17 is thus provided for attaching fixed seconds wheel SFA 2 to movable portion **4*c* of flexure bearing 4. Preferably, this means of attachment 27 can be at least one extension of material of fixed seconds wheel SFA 2 to form a single piece with the wheel. Two extensions of material 27 can be arranged to be inserted, for example by force, respectively in the two openings 17 of movable portion 4*c* of flexure bearing 4 to ensure good retention and without protruding from each opening 17. It is also possible to provide an edge around each extension of material 27 that can be directly secured to the corresponding extension of material to provide a space between the lower face of fixed seconds wheel SFA 2 and an upper face of flexure bearing 4**.

Flexure bearing 4 also comprises a fixed portion **4*b* with at least one opening 16, but preferably two openings 16, to be mounted and secured via a screw and nut assembly (not represented) on a watch movement support, such as a plate. Several elastic strips 4*a* or elastic strip portions connect movable portion 4*c* to fixed portion 4*b* in addition to intermediate portions, possibly between movable and fixed portions 4*c* and 4*b*. Flexure bearing 4 is mounted through an axial opening, coaxially to seconds-wheel pinion 5 and around an axial tube of fixed seconds wheel SFA 2 coaxial to the axis of seconds-wheel pinion 5**.

It should also be noted that it is possible to envisage having two attachment openings arranged in fixed seconds wheel SFA 2 for receiving, by forcible insertion, two extensions of material of movable portion **4*c* of flexure bearing 4 in a similar but reverse manner to what was described above. The means of attachment can also be a screw and nut assembly passing through openings in the movable portion and fixed seconds wheel SFA 2, but with this type of assembly, too much space is wasted. Likewise, fixed portion 4*b* of flexure bearing 4 can be attached to the plate by other means than the screw and nut assembly, taking the example of the attachment of second seconds wheel SFA 2 to flexure bearing 4. In the rest position, i.e. after switching from jump mode to stop mode, the elastic strips 4*a* of flexure bearing 4 must be pre-stressed to accumulate mechanical energy in order to rotate fixed seconds wheel SFA 2**, in particular in the anticlockwise direction (SIAM).

The rotation of fixed seconds wheel SFA 2 also drives escape wheel set 11 via an escape pinion 12 coaxial with the escape wheel set of Swiss lever escapement mechanism 13. This is advantageous for maintaining the operation of the escapement mechanism with oscillator 14 in this stop phase by the mechanical energy accumulated in flexure bearing 4 with elastic strips **4*a* acting on fixed seconds wheel SFA 2** to rotate the latter in the anticlockwise direction (SIAM).

Rack 3 is connected, without the action of a spring, to a cam 6 attached to fixed seconds wheel SFA 2 to lock or release said going train, depending on the angular position of said fixed seconds wheel SFA 2, by the retention of a flirt 7, as the locking element. This flirt 7 comes into contact with a stop piece 3*a* of the locking part of rack 3. This stop piece is a pallet stone 3*a*, as described above.

In the case represented, fixed seconds wheel SFA 2 can rotate through 5 small steps corresponding to an angle of 6° representing one second in the opposite direction. Flirt 7 is itself driven by the going train and retained by stop piece 3*a*. Once released at the end of the stop phase, the rotation of rack 3 releases flirt 7 which starts the jump phase. During the jump phase, flirt 7 makes a rotation corresponding to a one-second jump, driven by the going train, in the case shown, half a revolution. The going train also drives tourbillon carriage 15 via seconds-wheel pinion 5 and fixed seconds wheel SFA 2 in the clockwise direction (SAM), which winds flexure bearing 4 again. This flexure bearing 4 of fixed seconds wheel SFA 2 is arranged to accumulate energy when said fixed seconds wheel SFA 2 is driven clockwise SAM during the jump phase and to restore it to said fixed seconds wheel SAF 2 anticlockwise SIAM during the stop phase.

Generally, in the stop phase, several half-oscillations of oscillator 14 occur prior to the release of the going train. This means that the frequency of oscillator 14 is generally higher than 1 Hz and, for example, in the present case, can be set at 2.5 Hz Since fixed seconds wheel SFA 2 rotates in the stop phase at each small step corresponding to a half-oscillation (alternation), 5 half-oscillations of oscillator 14 can be counted in the stop phase until rotating locking element 7 is released for the jump phase. Flexure bearing 4 connected to fixed seconds wheel SFA 2 must thus supply energy during the 5 half-oscillations of oscillator 14 or the carriage is stopped and must be rewound during the jump of said carriage 15.

Flexure bearing 4 represented in FIG. 2 comprises a fixed portion 4*b* arranged inside a housing with a wide V-shaped opening in movable portion 4*c*, which comprises an axial opening, which is coaxial to the axis of seconds-wheel pinion 5. Two through openings 16 are provided in fixed portion 4*b* and arranged on the same line with the axial opening. Two through openings 17 are provided in movable portion 4*c* and arranged practically on the same line with the axial opening.

In this embodiment, five successive elastic strips 4*a* connect a first inner side of movable portion 4*c* to a first inner side of fixed portion 4*b*. A first elastic strip 4*a* from movable portion 4*c* is connected to a first central intermediate portion. A second elastic strip 4*a* from the first central intermediate portion is connected to a first peripheral intermediate portion. A third elastic strip 4*a* from the first peripheral intermediate portion is connected to a second central intermediate portion. A seconds elastic strip 4*a* from the second central intermediate portion is connected to a second peripheral intermediate portion. A fifth elastic strip from the second peripheral intermediate portion is connected to a first inner side of fixed portion 4*b*.

Five successive elastic strips 4*a* connect a second inner side of movable portion 4*c* to a second inner side of fixed portion 4*b*. A second elastic strip 4*a* from movable portion 4*c* is connected to the same first central intermediate portion. A second elastic strip 4*a* from the same first central intermediate portion is connected to the same first peripheral intermediate portion. A third elastic strip 4*a* from the first peripheral intermediate portion is connected to the same second central intermediate portion. A seconds elastic strip 4*a* from the second central intermediate portion is connected to the same second peripheral intermediate portion. A fifth elastic strip from the second peripheral intermediate portion is connected to a first inner side of fixed portion 4*b*.

It can be seen that fixed portion 4*b* is arranged inside between movable portion 4*c* and the two peripheral intermediate portions. Moreover, the two central intermediate portions form an arc of a circle centred on the axis of seconds-wheel pinion 5, and likewise the two peripheral intermediate portions are also centred on the axis of seconds-wheel pinion 5.

However, there could be more or fewer half-oscillations of oscillator 14 in the stop phase depending on the oscillation frequency of oscillator 14. Each half-oscillation must be equal to 0.2 seconds for a 2.5 Hz oscillator. The number n of half-oscillations of the oscillator can thus be chosen only for an oscillator frequency of more than 1 Hz, for example for at least n=3 half-oscillations for 1.5 Hz or n=5 for 2.5 Hz. The number of small steps made by fixed seconds wheel SFA 2 in the stop phase must correspond to a 1 second jump in the jump phase.

It is possible to consider jumps with a period greater than 1 second, which generalises the above rule to an oscillator frequency higher than the frequency of the display jumps. In this manner, there could be a jump every minute.

Referring to the embodiment shown in FIGS. 1 and 2, rotating locking element 7 is a flirt in the form of a shaft rotatably mounted at its centre. The flirt is integral with an axial locking pinion 8 for meshing with an intermediate wheel 9 of the going train. Locking rack 3 is rotatably mounted at a first end opposite the locking part, which comprises locking pallet stone 3*a*. As indicated above, rotating locking rack 3 comprises at a second end, an edge portion 3*b*, which is a finger 3*b* guided inside a housing made in cam 6, which is integral with fixed seconds wheel SFA 2. This cam 6, formed of two teeth with the housing between the two teeth, controls the pivoting of rack 3, which comprises locking pallet stone 3*a* arranged on an opposite side to finger 3*b*. As indicated above, this pallet stone 3*a* can be made of a hard material reducing friction with locking element 7 which is in contact with pallet stone 3*a* in a stop phase.

Pallet stone 3*a* is arranged to cooperate in abutment with said locking element 7, which is a flirt, to lock said going train in a stop phase, or to release said locking element 7 and said going train in a jump phase. Flirt 7 comprises a first locking shaft portion and a second locking shaft portion with respect to its centre which comprises axial locking pinion 8. Once pallet stone 3*a* is no longer in contact with the first shaft portion of flirt 7 or the second shaft portion of flirt 7, in the jump phase, flirt 7 is set in rotation and rotates 180° to allow the going train to rotate before a new locking position of the going train in a stop mode. In the jump mode, tourbillon carriage 15 is driven 6° in rotation clockwise (SAM) by the going train to add one second to the time. Fixed seconds wheel SFA 2 is driven with carriage 15, which is connected to coaxial seconds-wheel pinion 5, through an angle of 6° to rewind flexure bearing 4 of rack SFA. Fixed seconds wheel SFA 2 is driven by carriage 15, since the escapement mechanism also rotates with the carriage. Flexure bearing 4 is rapidly rewound, which means that the end of flirt 7 returns directly into contact with stop pallet stone 3*a* once flirt 7 has rotated 180°. The moment that locking occurs again, a new stop phase operation starts.

It is understood that the 180° rotation of flirt 7 prior to a new stop phase is directly and dynamically linked to the inertia of the moving components. In particular, the inertia of flirt 7, which has the fastest rotation, is of great importance. Thus, a low inertia design of flirt 7 will be preferred, such that it can be obtained using nickel or nickel phosphorus LIGA fabrication means or silicon DRIE fabrication means. These fabrication means allow flirt 7 to be made with a precise geometry advantageous for limiting the inertia of flirt 7.

During the stop phase, escape wheel set 11 is driven in a first direction of rotation (SIAM) by fixed seconds wheel SFA 2, which corresponds to each half-oscillation of the maintained oscillator 14. 5 small steps are made by escape wheel set 11, driven in rotation by fixed seconds wheel SFA 2 and by means of escape pinion 12. This lets down flexure bearing 4 which drives fixed seconds wheel SFA 2 and moves said pallet stone 3*a* in the direction of release of flirt 7.

Since the going train is locked in the stop mode with the exception of fixed seconds wheel SFA 2, flexure bearing 4 connected to fixed seconds wheel SFA 2 releases energy to rotate said fixed seconds wheel SFA 2 to drive escape wheel set 11. In the jump mode, as soon as flirt 7 is no longer in contact with pallet stone 3*a*, the going train, by means of axial locking pinion 8 of flirt 7, is arranged to pivot said fixed seconds wheel SFA 2, by means of seconds-wheel pinion 5 and tourbillon carriage 15. This fixed seconds wheel SFA 2 rotates through an angle of 6° with tourbillon carriage 15 in a second direction of rotation, which is the clockwise direction (SAM) opposite to said first direction of rotation imparted to escape wheel set 11 by fixed seconds wheel SFA 2, in a movement corresponding to an angular jump of one second. Tourbillon carriage 15 is pivoted through an angle of 6° in the jump mode in the clockwise direction (SAM) in a direction opposite to the pivoting of fixed seconds wheel SFA 2 in the stop phase. At the end of the jump, flirt 7 returns to rest against pallet stone 3*a* to lock the going train once more with the exception of fixed seconds wheel SFA 2. Flirt 7 with its two shaft portions of equal length makes a rotation of 180° to switch from the jump mode to the next stop mode.

It should be noted that flirt 7 is connected to the going train and to the barrel by intermediate wheel 9 in order to rotate about its central axis in each 1 second jump mode and to release going train 5, 8, 9, 10, in addition to tourbillon carriage 15 in this embodiment. The force of the spring or springs driving the going train is greater than the mechanical energy accumulated in flexure bearing 4. Thus, the going train is immediately activated as soon as it is released, which makes it possible to maintain good synchronism over time, given also that the escapement mechanism and oscillator 14 continue to operate during the stop phase, even though the going train is locked except for fixed seconds wheel SFA 2.

All the elements of the force control mechanism described above are mounted on a plate, a medium wheel bridge, a flirt bridge, which are not represented to avoid overloading the drawing.

As already mentioned above, fixed seconds wheel SFA 2 comprises a peripheral toothing meshing with toothed escape pinion 12 coaxial to escape wheel set 11. A medium wheel 10, comprised in the going train, has a peripheral toothing meshing with axial toothed seconds-wheel pinion 5, coaxial to fixed seconds wheel SFA 2, and the arbor of seconds-wheel pinion 5 is connected to tourbillon carriage 15. An intermediate wheel 9, also comprised in said going train comprises an axial toothed intermediate pinion 19 meshing with the peripheral toothing of medium wheel 10. Intermediate wheel 9 comprises a peripheral toothing for meshing with said axial locking pinion 8 integral with rotating locking element 7, which is the flirt. In the jump phase, when said going train is released, axial toothed intermediate pinion 19 is arranged to allow medium wheel 10 to rotate, to enable it to pivot tourbillon carriage 15 via seconds-wheel pinion 5 in said second direction of rotation SAM. In this second direction of rotation, seconds-wheel pinion 5 supplies the energy to be accumulated in flexure bearing 4 by rotating fixed seconds wheel SFA 2 in direction SAM.

To determine certain dimensional values to suit the elements described above, it can be mentioned that the locking is achieved by a gear train from medium wheel 10 and a flirt 7 of large diameter. This makes it possible to limit movement during the seconds function, to limit friction, and to move the pivoting of flirt 7 away from the surface occupied by the tourbillon carriage on the plate.

The high ratio between the medium wheel 0.116 rpm and the flirt 0.5 rps (30 rpm) requires an intermediate wheel set, which is intermediate wheel 9. This gives, for example, a ratio between medium wheel 10 and intermediate wheel 9 of Z=120/7 and m=0.07 mm, and a ratio between intermediate wheel 9 and flirt 7 of Z=90/6 and m=0.07 mm.

In an alternative version, it is possible to drive flirt 7 directly from tourbillon carriage 15. This requires making a tourbillon carriage with an outer toothing in mesh with axial locking pinion 8, which is the flirt pinion. The ratio between carriage 15 and flirt 7 of 1 rpm and flirt 0.5 rps (30 rpm), can be achieved with a direct gear. The ratio between the outer tourbillon toothing and the flirt pinion is Z=180/6 with m=0.079 mm with an identical flirt position to that of the preceding version. However, the aesthetics of the tourbillon carriage is compromised by this outer toothing.

The amount of lock (stop phase) on pallet stone 3*a* of rack 3 is 0.08 mm, which is comfortable for a lever escapement, but probably rather small given the length of the rack. The design can easily gain 25% by increasing the working radius of pallet stone 3*a*. In any event, the increase in movement (for safety) on pallet stone 3*a* increases friction-related risks.

By way of reminder, referring for example to FIG. 2, in the stop phase, the going train is locked by flirt 7 resting on pallet stone 3*a* of rack 3, and escape wheel set 11 with its escape pinion 12 is driven by fixed seconds wheel SFA 2 with flexure bearing 4. In the jump phase, pallet stone 3*a* of rack 3 releases the going train. Seconds-wheel pinion 5 rotates 6° (one second) and winds flexure bearing 4 again for seconds wheel 2. Rack 3 of SFA locks the going train. Finger 3*b* of rack 3 follows the movement of cam 6 until pallet stone 3*a* is no longer in contact with the end of flirt 7 to release the going train. All the other elements already mentioned above, which are sufficiently clearly shown in the preceding Figures, will not be repeated.

Figure 3A:
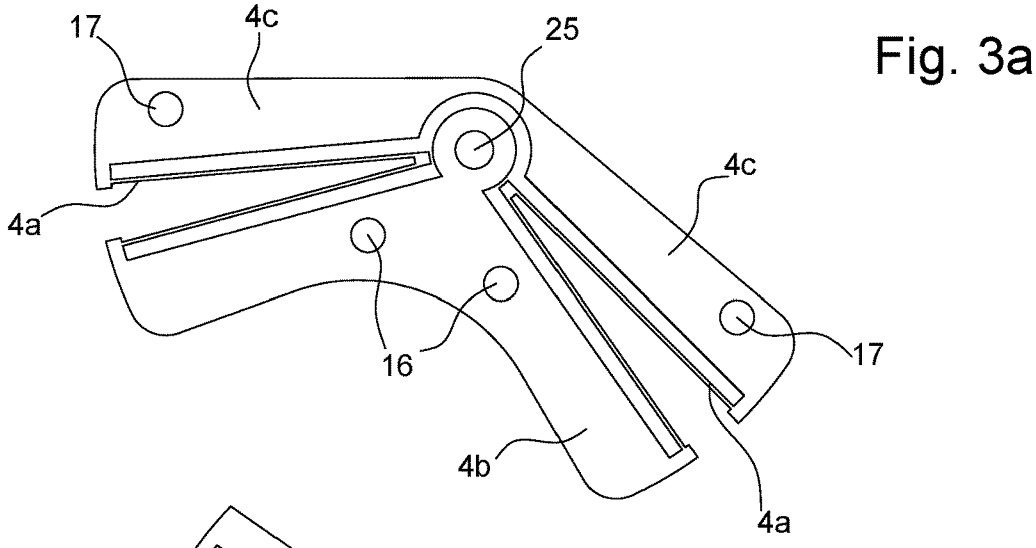
FIGS. 3*a*, 3*b* and 3*c* represent plan views of three embodiments of flexure bearings with elastic strips or pivots with flexible strips with higher torques and better axial retention in order to be connected to the seconds wheel according to the invention.
Figure 3B:
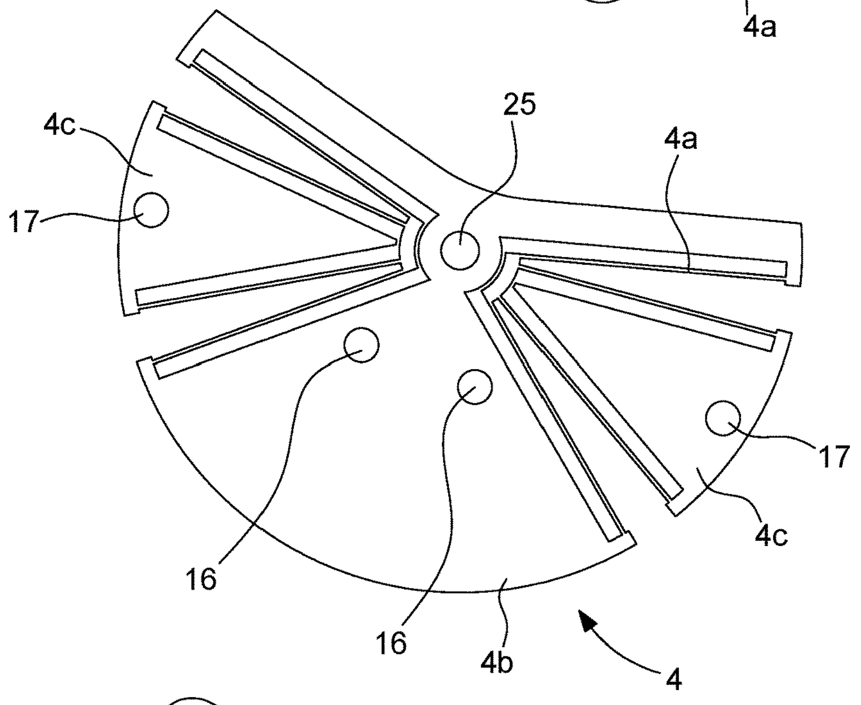
Figure 3C:
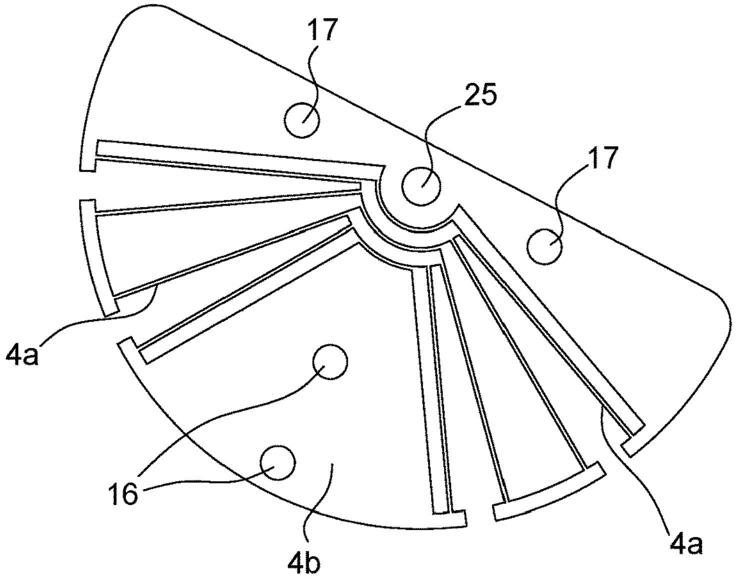

FIGS. 3*a*, 3*b* and 3*c* represent three different embodiments of flexure bearing 4, which can be attached, on the one hand beneath fixed seconds wheel SFA 2, and on the other hand, to a support of the movement, such as a plate. Such embodiments make it possible to obtain higher torques and better axial retention. These three embodiments are also different from the embodiment shown in FIGS. 1 and 2 and described above.

FIG. 3*a* shows fixed portion 4*b* and movable portion 4*c* of flexure bearing 4, which are both connected by several elastic strips or strip springs, preferably two V-shaped elastic strips. Each of elastic strips 4*a* connects a peripheral end of each fixed portion 4*b* and movable portion 4*c*. Two through openings 16 are also provided in fixed portion 4*b* for attachment to a movement support, and two through openings 17 in movable portion 4*c* for attachment to fixed seconds wheel SFA 2. The position of these through openings 16, 17 is also dependent on the dimension of fixed seconds wheel SFA 2 and its attachment parts. Fixed portion 4*b* also comprises an axial opening 25 for mounting flexure bearing 4 coaxially to the axis of seconds-wheel pinion 5 and preferably on the axial tube of fixed seconds wheel SFA 2.

FIG. 3*b* shows one fixed portion 4*b* and two movable portions 4*c* each arranged in a respective V-shaped housing of the fixed portion and symmetrically opposite one another. The two movable portions 4*c* are also connected by several elastic strips 4*a* in conjunction with an intermediate portion close to axial opening 25 of flexure bearing 4. Two through openings 16 in fixed portion 4*b* are made in the most compact portion, and one through opening 17 is made in each movable portion 4*c*. This structure in FIG. 3*b* makes it possible to increase the return torque and the stiffness of the assembly by the addition of parallel pairs of strips.

Finally, FIG. 3*c* shows a fixed portion 4*b* arranged inside a housing with a wide, V-shaped opening of movable portion 4*c*, which this time comprises axial opening 25. Two through openings 16 are provided in fixed portion 4*b* and arranged on the same line with axial opening 25. Two through openings 17 are provided in movable portion 4*c* and arranged practically on the same line with axial opening 25. In this embodiment, four successive elastic strips 4*a* connect a first inner side of movable portion 4*c* to a first inner side of fixed portion 4*b*, where two first elastic strips 4*a* from movable portion 4*c* are connected by a first central intermediate portion, while two second elastic strips 4*a* from fixed portion 4*c* are connected by a second central intermediate portion, the two intermediate strips being connected by a first peripheral intermediate portion. Four successive elastic strips 4*a* connect a second inner side of movable portion 4*c* to a second inner side of fixed portion 4*b*, where two first elastic strips 4*a* from movable portion 4*c* are connected by the same first central intermediate portion, while two second elastic strips 4*a* from fixed portion 4*c* are connected by the same second central intermediate portion, the two intermediate strips being connected by a second peripheral intermediate portion. This FIG. 3*c* structure makes it possible to reduce the return torque and increase the angle of rotation by the addition of pairs of strips in series.

It is clear that the type of materials chosen to make these flexure bearings 4 are materials used to make metal springs. In the different variants of flexure bearing 4 described above, each flexure bearing 4 can take the form of a flat plate, whose thickness can be chosen to be substantially equivalent to the thickness of the central portion of fixed seconds wheel SFA 2.

Figure 4:
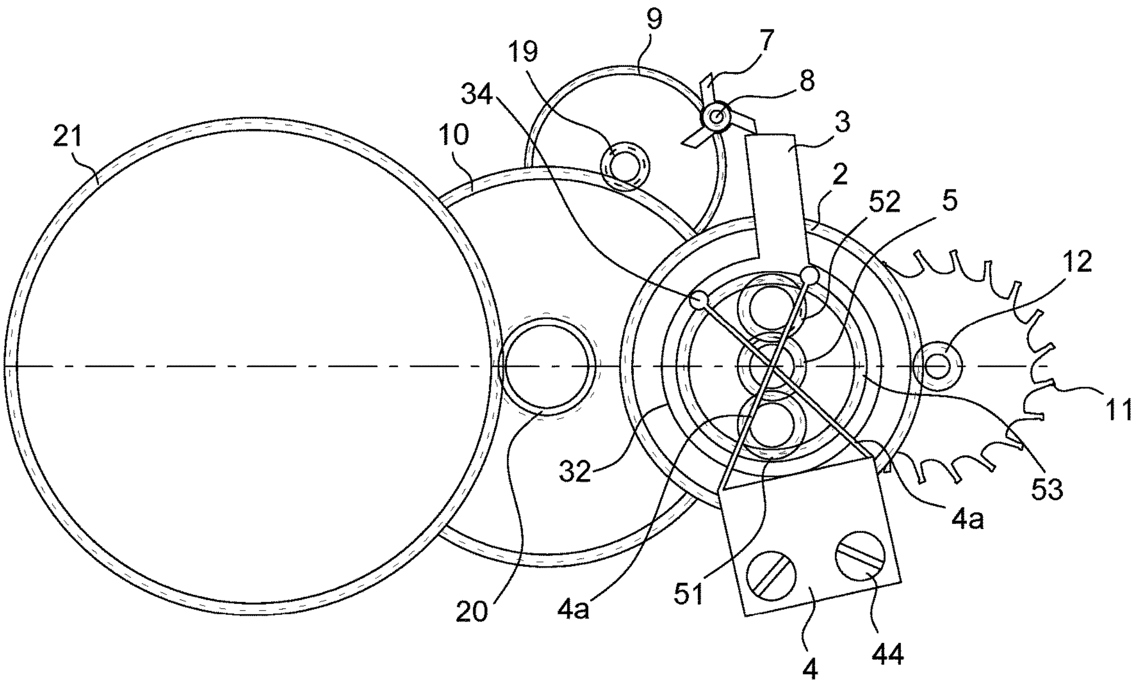
FIG. 4 represents a bottom view of another schematic embodiment of a conventional mechanical watch movement with the going train without a tourbillon, and the force control mechanism according to the invention.

FIG. 4 represents, in addition, another schematic embodiment of a conventional mechanical watch movement with the going train and the force control mechanism according to the invention. Certain elements already described with reference to FIGS. 1 and 2 are shown again in this embodiment of the conventional movement, which does not have a tourbillon. However, there is an accumulation of energy by a flexure bearing 4 with crossed strips 4*a* connected to a stop member 3 connected to a crown 32 rotatably mounted on fixed seconds wheel SFA 2. Flexure bearing 4 comprises a fixed base portion, which can be secured by screws 44 to a watch movement support, and a movable portion which may be crown 32 itself connected to stop member 3. Elastic strips 4*a* are secured, for example, by weld spots 34 to crown 32. In this case, as indicated above, flexure bearing 4 must rotate fixed seconds wheel SFA 2 with stop member 3 in the anticlockwise direction (SIAM) in the stop phase of the movement.

In this embodiment, the two phases can again be specified, which are, on the one hand, the stop phase, and on the other hand the jump phase. In the stop phase, going train 5, 8, 9 10 is locked by one tooth of locking element 7 resting against stop member 3. Escape wheel set 11 is driven by fixed seconds wheel SFA 2 in the anticlockwise direction (SIAM) by the action of flexure bearing 4 on stop member 3 connected to fixed seconds wheel SFA 2. In the jump phase, stop member 3 is moved to release the going train. At the same moment, seconds-wheel pinion 5 rotates 6° in the clockwise direction (SAM), driving crown 53 via planet wheels 51, 52 also in the clockwise direction, which also winds flexure bearing 4 again. Since stop member 3 returns to the locking position, stop member 3 locks the going train again for a new stop phase operation to maintain the operation of the escapement mechanism connected to the oscillator.

Planet wheels 51, 52 are again mounted in conjunction with seconds-wheel pinion 5 coaxial to seconds wheel 2. Stop member 3 can be a curved plate 3 pivoting about an axis and driven by flexure bearing 4 in this embodiment. In a stop phase, stop member 3 is in contact with one tooth of a locking element 7 which comprises, in a central portion, an axial locking pinion 8 for driving intermediate wheel 9 having a peripheral toothing. Locking element 7 may comprise several teeth on the periphery thereof to come into contact with stop member 3 in the stop phase. In the jump phase, locking element 7 is released to rotate through an angle of 120° defining the seconds jump, since there are 3 locking teeth.

In the stop phase, escape wheel set 11 is driven by fixed seconds wheel SFA 2 via its coaxial escape pinion 12 in mesh with a peripheral toothing of fixed seconds wheel SFA 2. At the jump phase, this accumulated energy is supplied to the going train for the seconds jump. Medium wheel 10 driven by intermediate pinion 19 of intermediate wheel 9, has a peripheral toothing for meshing with coaxial seconds-wheel pinion 5 for the seconds jump. With no direct influence on this jump phase, a medium large wheel 21 has a peripheral toothing for meshing with a coaxial medium-wheel pinion 20. By the action of seconds-wheel pinion 5, when the going train is operating, the arrangement with the differential with planet wheels 51, 52 and crown 53 winds flexure bearing 4 of SFA again to return to the stop mode with stop member 3 locking element 7 by one of its teeth.

it is to be noted that flexure bearing 4 with crossed elastic strips 4*a* is well known. A particular configuration where the strips cross at seven eighths of their length has already been described in the work of W. H. Wittrick "The properties of crossed flexure pivots and the influence of the point at which the strips cross" in The Aeronautical Quarterly 11(4), pages 272 to 292 (1951). Further, pivots with flexure strips are known and described in particular in the work by Simon Heinein, entitled "Conception des guidages flexibles" (Design of flexure bearings) and edited by PPUR presses polytechniques, in 2001.

The seconds wheel or wheel set can be pivoted on a ball bearing carried by the plate.

FIG. 5 shows a bottom to top cross-section of the mechanism at the centre of the tourbillon as partly shown above with reference to FIG. 1 or FIG. 2. It is especially noted in this Figure that seconds-wheel pinion 5 is the arbor of tourbillon carriage 15. Fixed seconds wheel SFA pivots concentrically to the axis of the tourbillon without touching it, because it is held in position by the flexure bearing system. Tourbillon carriage 15 contains the escapement mechanism with escape wheel set 11, Swiss lever 13 and in connection with oscillator 14, which is the balance/balance spring.

Fixed seconds wheel SFA 2 meshes with escape pinion 12, which means that when tourbillon carriage 15 rotates at each second, a rotation is also made for the escapement mechanism connected to the oscillator and also the fixed seconds wheel SFA 2.

Flexure bearing 4 is secured to fixed seconds wheel SFA 2. To achieve this, at least one means of attachment 27 is thus provided in or through openings 17 to attach fixed seconds wheel SFA 2 to the movable portion of flexure bearing 4 as indicated above. These attachment means 27 are preferably extensions of material of central portions of seconds wheel 2 so that they can be forcibly inserted into openings 17 of flexure bearing 4. These extensions of material 27, and an edge around these extensions of material are directly integral with the rest of the seconds wheel to form a single piece.

As explained above, a finger-shaped edge portion 3*b* of rack 3 is arranged freely inside a guide housing between two teeth of a cam 6 visible in FIG. 2. Since cam 6 is fixedly secured to said fixed seconds wheel SFA 2 close to its centre, this drives in rotation rack 3, which, on another side, comprises locking pallet stone 3*a* for locking flirt 7 in a stop mode. Flirt 7 further comprises an axial locking pinion 8, which can be rotated when flirt 7 is released in the jump mode. All the other elements have already been explained above and will not be repeated again.

From the description that has just been given, multiple variants of the mechanical movement watch with a force control mechanism and of the jumping seconds type can be devised by those skilled in the art without departing from the scope of the invention defined by the claims. The mechanical movement can be a conventional mechanical movement with a fixed seconds wheel SFA which is also connected to drive or maintain the operation of the escape wheel set with the oscillator in a stop phase.

The invention claimed is:

1. A mechanical movement watch with a force control mechanism, and of a jumping seconds type, the force control mechanism being arranged in a going train of the mechanical movement, which is arranged between an energy source and an escape wheel set comprised in an escapement mechanism connected to an oscillator intended to be set in oscillation in normal operation by a drive generated by said energy source to rotate said escape wheel set always in a single direction of rotation at each half-oscillation of the oscillator, said escape wheel set meshing with a seconds wheel, wherein said force control mechanism comprises a rotating locking element arranged to cooperate with a stop member in conjunction with said seconds wheel to lock said going train in a stop mode or release said going train in a jump mode, depending on the angular position of said seconds wheel, and a flexure bearing with elastic strips attached to the seconds wheel, and to a support of the watch movement, said flexure bearing with elastic strips being in a pre-wound state in the stop mode and arranged to drive in rotation the seconds wheel and the escapement mechanism connected to the oscillator at each half-oscillation of the oscillator in the stop mode, and the going train allowing the rotating locking element and a seconds-wheel pinion coaxial to said seconds wheel to rotate in order to make a one-second jump in the jump mode, and also allowing the flexure bearing with elastic strips to be rewound while allowing the rotating locking element and the going train to be locked for the stop mode following the jump mode.

2. The mechanical movement watch according to claim 1, wherein the flexure bearing with elastic strips, once pre-wound, is arranged to gradually move the stop member in the stop mode to a position of release of the rotating locking element at the switch to the jump mode, and to drive in rotation the seconds wheel and to allow the escapement mechanism connected to the oscillator to be driven in the stop mode.

3. The mechanical movement watch according to claim 2, wherein the stop member is a rack rotatably mounted about an arbor at a first end and comprising a locking part at a second end, a tooth-shaped edge portion arranged in a guide housing of a cam fixedly secured to the seconds wheel close to the centre thereof in order to be driven in rotation, and wherein a stop piece at the second end of the locking part, is arranged on a side opposite the edge portion and arranged to lock the rotating locking element in a stop mode.

4. The mechanical movement watch according to claim 1, wherein the rotating locking element is a flirt, which is made by a LIGA or DRIE method.

5. The mechanical movement watch according to claim 1, wherein the watch is a tourbillon watch, wherein an arbor of a tourbillon carriage containing the escapement mechanism connected to the oscillator is the seconds-wheel pinion, wherein in the stop mode with the going train locked, the seconds wheel is arranged to drive the escape wheel set in small steps in a first direction of rotation, at each half-oscillation of the oscillator by the action of the flexure bearing with elastic strips which is pre-wound and attached to the seconds wheel, and wherein, in the jump mode, when the going train is released, the seconds-wheel pinion is driven by a wheel of the going train to make an angular jump of one second corresponding to the number of small steps made to drive the seconds wheel in the stop mode, in a second direction of rotation opposite to the first direction of rotation, the tourbillon carriage, the escapement mechanism with the oscillator and the seconds wheel connected to the escapement mechanism being moved in rotation by an angle of 6° corresponding to one second in the jump mode, and the flexure bearing is rewound to start a successive stop mode with the going train locked.

6. The mechanical movement watch according to claim 5, wherein the first direction of rotation is a rotation in the anticlockwise direction, while the second direction of rotation is a rotation in the clockwise direction.

7. The mechanical movement watch according to claim 3, wherein the locking element is a flirt, which comprises a first locking shaft portion and a second locking shaft portion with respect to the centre thereof which comprises an axial locking pinion so as to make one half-revolution in the jump mode before being locked by the pallet stone of the rack in the stop mode.

8. The mechanical movement watch according to claim 1, wherein the seconds wheel comprises a peripheral toothing meshing with a toothed escape pinion coaxial to said escape wheel set, a medium wheel of the going train having a peripheral toothing meshing with the seconds-wheel pinion coaxial to said seconds wheel, an intermediate wheel also comprised in said going train comprising an axial toothed intermediate pinion meshing with a peripheral toothing of the medium wheel, said intermediate wheel comprising a peripheral toothing for meshing with said axial locking pinion integral with said rotating locking element.

9. The mechanical movement watch according to claim 1, wherein the escapement mechanism is a Swiss lever escapement mechanism of the mechanical movement, and wherein said oscillator is a balance/balance spring intended to be set in oscillation by a drive generated by a mainspring forming said energy source in normal operating mode.

10. The mechanical movement watch according to claim 3, wherein the pallet stone of the rack is made of a hard material to reduce friction.

11. The mechanical movement watch according to claim 1, wherein the flexure bearing comprises at least one fixed portion, at least one movable portion, and elastic strips connecting the fixed portion to the movable portion.

12. The mechanical movement watch according to claim 11, wherein the fixed portion is arranged to be secured to a movement support, and wherein the movable portion is arranged to be secured to the seconds wheel.

13. The mechanical movement watch according to claim 12, wherein the fixed portion comprises at least one opening for the passage of a means of attachment to the movement support, and wherein the movable portion comprises at least one opening for attaching the seconds wheel.

14. The mechanical movement watch according to claim 13, wherein the fixed portion and the movable portion of the flexure bearing are both connected by several elastic strips, in that each of the elastic strips connects a peripheral end of each fixed portion and each movable portion, in that two through openings are provided in the fixed portion for attachment to a movement support, and wherein two through openings are provided in the movable portion for attachment to the seconds wheel.

15. The mechanical movement watch according to claim 13, wherein one fixed portion is provided, whereas two movable portions are each arranged in a respective V-shaped housing of the fixed portion and symmetrically opposite one another, in that the two movable portions are also connected by several elastic strips in conjunction with an intermediate portion close to the axial opening of the flexure bearing, in that two through openings are made in the fixed portion and wherein one through opening is made per movable portion.

16. The mechanical movement watch according to claim 11, wherein the flexure bearing comprises a fixed portion arranged in a wide V-shaped housing of the movable portion, which comprises an axial opening, in that two through openings are provided in the fixed portion and arranged on the same line with the axial opening, in that two through openings are provided in the movable portion and arranged practically on the same line with the axial opening, in that four successive elastic strips connect a first inner side of the movable portion to a first inner side of the fixed portion, wherein two first elastic strips from the first movable portion are connected by a first central intermediate portion, whereas two second elastic strips from the fixed portion are connected by a second central intermediate portion, the two intermediate strips being connected by a first peripheral intermediate portion, in that four successive elastic strips connect a second inner side of the movable portion to a second inner side of the fixed portion, wherein two first elastic strips from the movable portion are connected by the same first central intermediate portion, whereas two second elastic strips from the fixed portion are connected by the same second central intermediate portion, the two intermediate portions being connected by a second peripheral intermediate portion.

17. The mechanical movement watch according to claim 11, wherein the fixed portion is arranged inside a housing with a wide V-shaped opening in the movable portion, which comprises an axial opening, which is coaxial to the axis of seconds-wheel pinion, in that two through openings are provided in the fixed portion and arranged on the same line with the axial opening, in that two through openings are provided in the movable portion and arranged practically on the same line with the axial opening, in that five successive elastic strips connect a first inner side of the movable portion to a first inner side of the fixed portion, in that a first elastic strip from the movable portion is connected to a first central intermediate portion, in that a second elastic strip from the first central intermediate portion is connected to a first peripheral intermediate portion, in that a third elastic strip from the first peripheral intermediate portion is connected to a second central intermediate portion, in that a seconds elastic strip from the second central intermediate portion is connected to a second peripheral intermediate portion, in that a fifth elastic strip from the second peripheral intermediate portion is connected to a second inner side of fixed portion, in that five successive elastic strips connect a second inner side of the movable portion to a second inner side of the fixed portion, in that a first elastic strip from the movable portion is connected to the same first central intermediate portion, in that a second elastic strip from the same first central intermediate portion is connected to the same first peripheral intermediate portion, in that a third elastic strip from the first peripheral intermediate portion is connected to the same second central intermediate portion, in that a seconds elastic strip from the second central intermediate portion is connected to the same second peripheral intermediate portion, and wherein the fifth elastic strip from the same second peripheral intermediate portion is connected to a first inner side of fixed portion.

18. The mechanical movement watch according to claim 1, wherein the watch comprises a conventional mechanical movement without a tourbillon, wherein the seconds wheel pivots on the seconds-wheel pinion, which is connected by one or two rotating planet wheels to a first crown forming a differential gear not secured to the seconds wheel, wherein the flexure bearing with crossed elastic strips is connected to another stop member, which is connected to a second crown mounted on the seconds wheel and coaxial to the axis of rotation, wherein the flexure bearing comprises a fixed base portion attached by an attachment means to a watch movement support, and a movable portion which can be the second crown itself, connected to the stop member, in that the crossed elastic strips are attached at one end thereof to the second crown.

* * * * *